Sept. 22, 1970 A. NISSEN 3,530,457

METHOD AND APPARATUS FOR DECODING

Filed Feb. 6, 1967 5 Sheets-Sheet 1

METHOD AND APPARATUS FOR DECODING

Filed Feb. 6, 1967

United States Patent Office 3,530,457
Patented Sept. 22, 1970

3,530,457

METHOD AND APPARATUS FOR DECODING

Alexandre Nissen, Boulogne-Billancourt, France, assignor to Videon, Boulogne-Billancourt, France, a corporation of France Filed Feb. 6, 1967, Ser. No. 614,322
Claims priority, application France, Feb. 7, 1966, 48,600
Int. Cl. G08b 5/22
U.S. Cl. 340—324 4 Claims

ABSTRACT OF THE DISCLOSURE

An apparatus for decoding coded information chiefly information transmitted through the binary code relying on a number of rotary cams corresponding to the number of bits or indicia of the said code and adapted to rotate round the same axis or round parallel axes so as to release for any predetermined relative position of the cams one and only one lever of a number of levers depending on the base of the code used, the released lever providing for a visualization of a corresponding digit, for instance through projection on a screen of said digit.

The present invention has as an object the provision of a mechanical decoding arrangement which allows in particular visualizing the figure corresponding to the coded combination.

The coded combination is supplied as a system of N informations, N being the number of bits or indicia forming the code; for instance N is equal to 4, 5 or 6 according as to whether the code is constituted by four, five or six moments. These N informations are supplied in any desired form and are transformed through means which are irrelevant as far as the invention is concened into positions to be assumed by cams the number of which is equal to the number of bits. Said cams can assume only two well-defined positions and the part to be played by the decoding arrangement consists chiefly in providing a mechanical selection of a corresponding lever, the number of levers depending on the value of the base of the numeric system used. For instance, in the case of the decimal numeric system, ten levers are used, whereas in the case of the binary system wherein four bits are provided for the code, sixteen ($2^N=2^4$) levers are required, which corresponds to the use of this binary code to a full extent.

According to the present invention, the selection of the levers is obtained by designing cams matching the coding system used, the arrangement being such that whatever may be the positions assumed by the different cams, one lever and only one to wit that corresponding to the indication required may rock, the rocking of said lever showing the associated digit in a suitable manner.

The present invention will be readily understood together with further features thereof from a reading of the following description of various embodiments given by way of an exemplification and by no means in a limiting sense, reference being made to the accompanying drawings wherein.

Figure 6A:
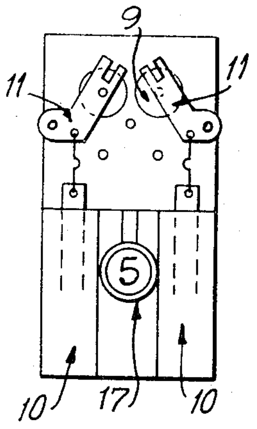
Figure 6B:
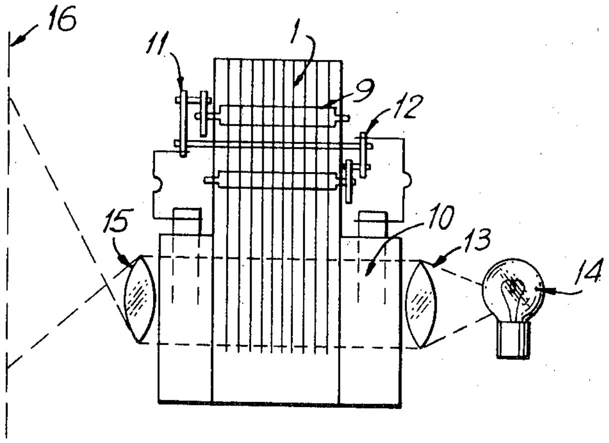
Figure 7:
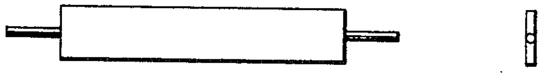
Figure 8:
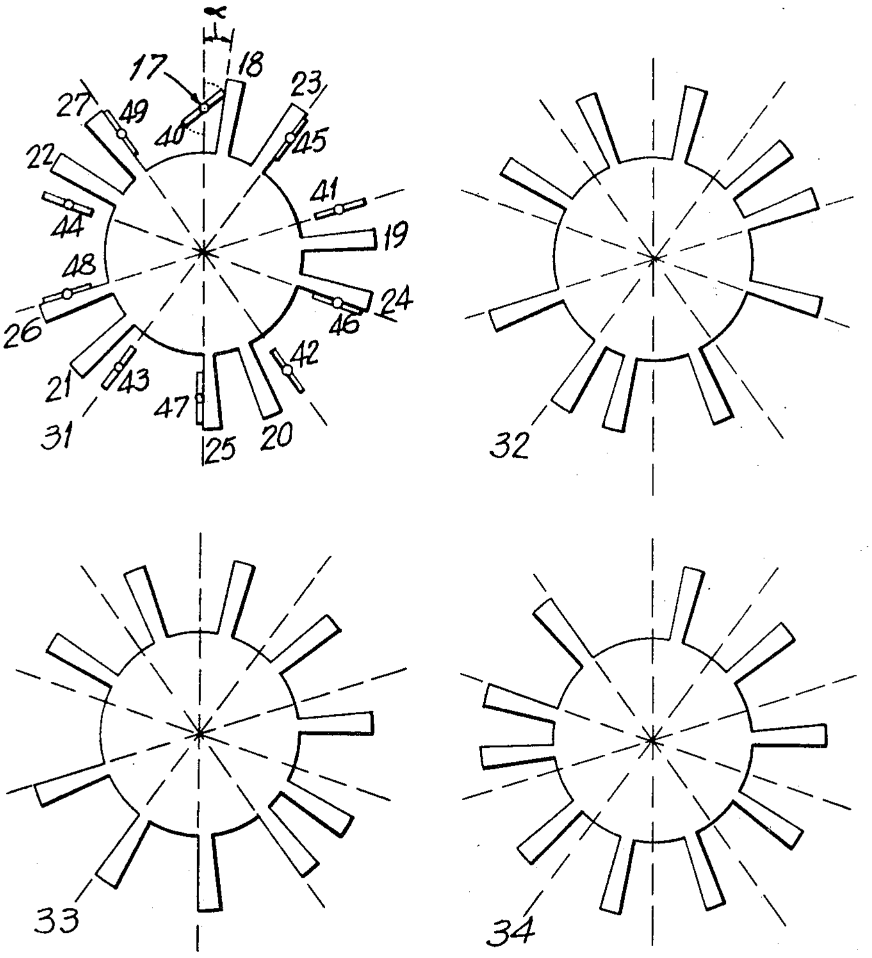
Figure 9:
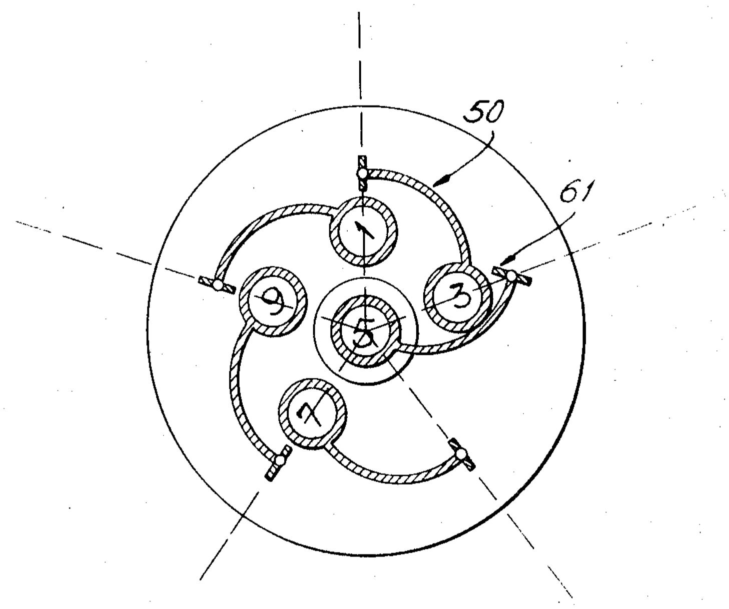

FIGS. 6, A and B are general views of a type of visualizing means, employed in accordance with the invention;

FIG. 7 shows a selecting blade to be incorporated with a modified embodiment;

FIG. 8 illustrates the shape of the cams provided for said modified embodiment;

FIG. 9 illustrates a detail of last-mentioned embodiment; and

Figure 10:
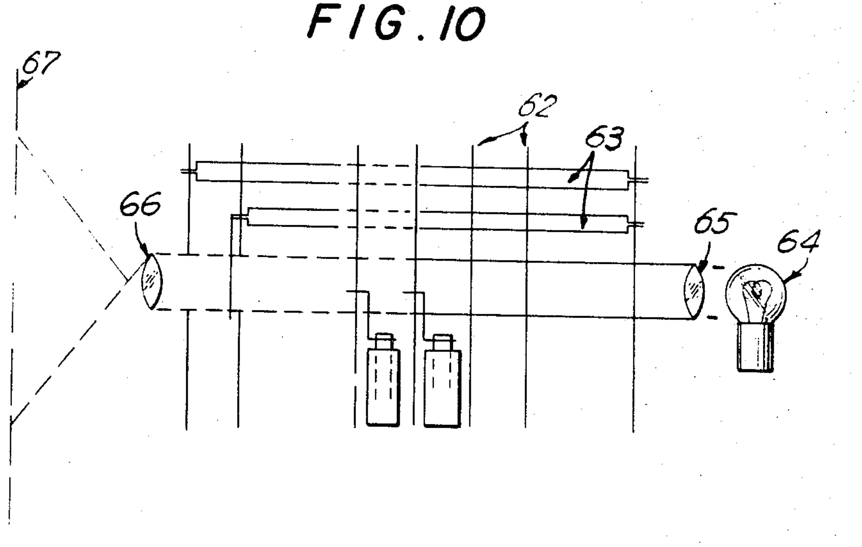

FIG. 10 is a general view of said last embodiment.

In the different figures, the same reference numbers designate the same parts.

The embodiment resorting to a binary code making use of four bits or indicia and consequently associated with $2^4=16$ (i.e., as well known in the binary system, $2^N$ combinations are possible) levers will be first described. In said embodiment, each lever 1 includes preferably four arms arranged in the manner illustrated in FIG. 1, said lever thus forming a cross. The four cams are illustrated in perspective view in FIG. 2; the first cam shown at 2 in FIG. 2 carries a first information in the binary code and is constituted by sixteen elementary cams each of which registers with one of the sixteen levers. The even-numbered elementary cams are all similar and set in the same direction while the odd-numbered cams are angularly shifted by one quarter of a revolution with reference to said even-numbered cams. The second cam illustrated at 3 includes eight elementary cams each of which has a width which is double that of the elementary cams of the preceding cam 2. The four elementary odd-numbered cams of said cam 3 form a first system and are all set in the same direction and the same is the case for the four other elementary cams of the said second cam 3. The angular setting of the odd-numbered cams differs by one quarter of a revolution from that of the even-numbered cams. The third cam 4 illustrated in FIG. 2 includes four elementary cams each of which has a width double that of each elementary cam of the third cam 9. Here again the system of odd-numbered cams is shifted by one quarter of a revolution with reference to the system including the two other even-numbered cams.

Lastly, the fourth cam illustrated at 5 includes two elementary cams, each of which has a width double that of the elementary cams of the cam 4, said elementary cams forming the cam 5 being angularly shifted by one quarter of a revolution with reference to each other.

Figure 3:
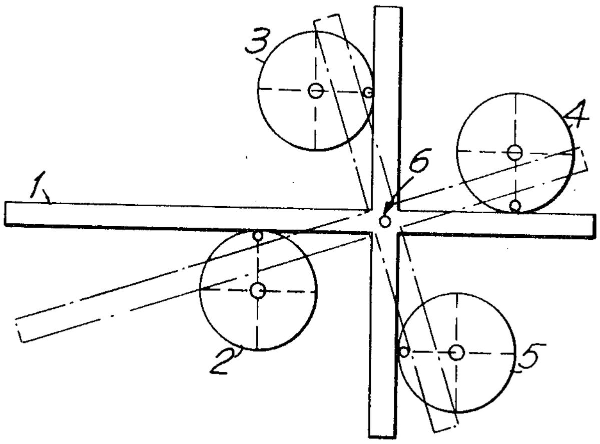
FIG. 3 shows the relative positions assumed by the cams and lever.

FIG. 3 is a sectional view of the arrangement of the cams and levers and as illustrated the lever 1 including four arms is associated with the above-described cams 2, 3, 4, 5, each cam bearing or being adapted to bear against a corresponding arm of the lever so as to prevent any rocking of said arm and consequently of the lever, the normal position of the lever being that illustrated in solid lines in FIG. 3. The sixteen levers are arranged in a side-by-side relationship (that is behind each other in FIG. 3) and are adapted to pivot independently on an axis 6 common to all the levers and extending perpendicularly to the plane of the drawing. The thickness of each lever in a direction perpendicular to the plane of the figure is equal to that of an elementary cam of the cam 2.

Any lever which is not held in position rocks either under the action of its own weight, since it is unbalanced for this purpose or else under the action of a spring similarly provided for this purpose.

It is an easy matter to ascertain that under such conditions and whatever may be the relative positions of the cams 2, 3, 4 and 5, there is always one lever and only one adapted to rock out of its position illustrated in solid lines into the position illustrated in interrupted lines, the rocking lever being that selected by the position assumed by the arrangement including the four cams.

Figure 4:
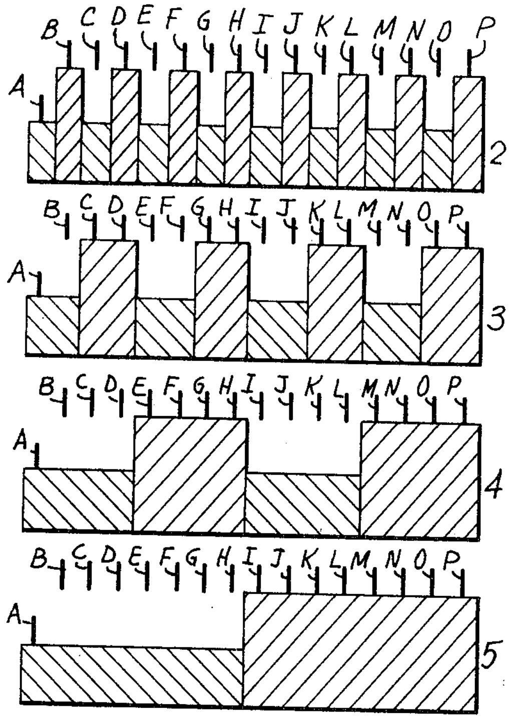
FIG. 4 shows the position of the cams for a predetermined selection.

For instance, in the case of the position corresponding to the binary figure 0000, the cams 2, 3, 4 and 5 occupy respectively, as seen in lateral elevational view, the positions illustrated in FIG. 4 and consequently only the lever A at the extreme left-hand side of FIG. 4 corresponding to digit 0 is allowed to rock, all the other levers being held in position respectively by the cam 2 for the levers B, D, F, H, J, L, N and P, by the cam 3 for the levers C, D, G, H, K, L, O and P, by the cam 4 for the levers E–H and M–P. Cam 5 holds levers I–P. If starting from the position illustrated in FIG. 4 the cam 2 is set in its second position through rotation by one quarter of a revolution, the lever number 1 and corresponding to the digit 1 is rocked.

Figure 1:
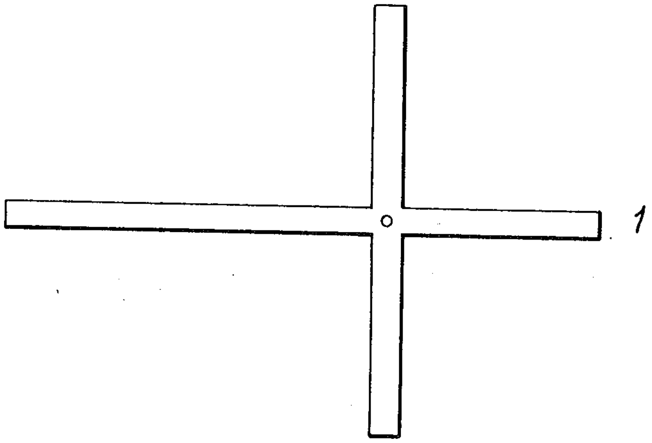
FIG. 1 illustrates a selecting lever, employed in accordance with the invention, in elevational view.
Figure 2:
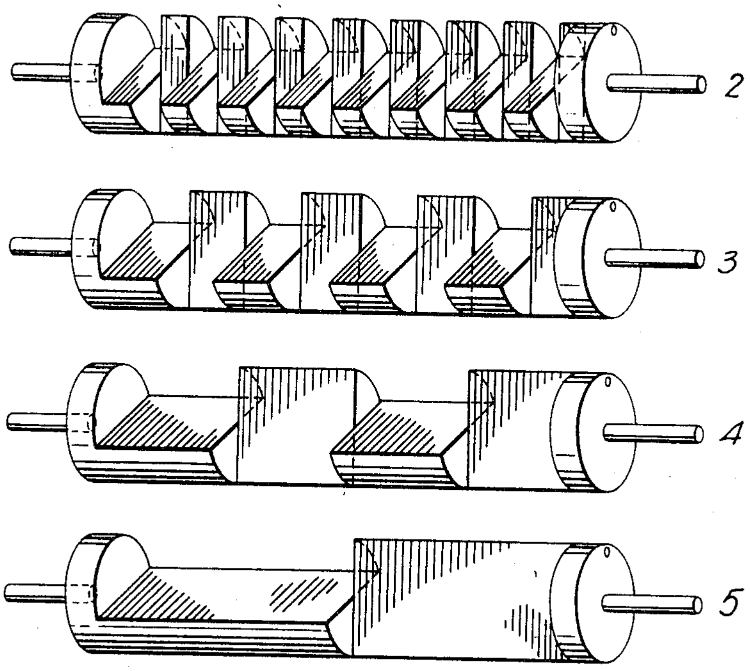
FIG. 2 is a perspective view of four selecting cams, employed in accordance with the invention.
Figure 5:
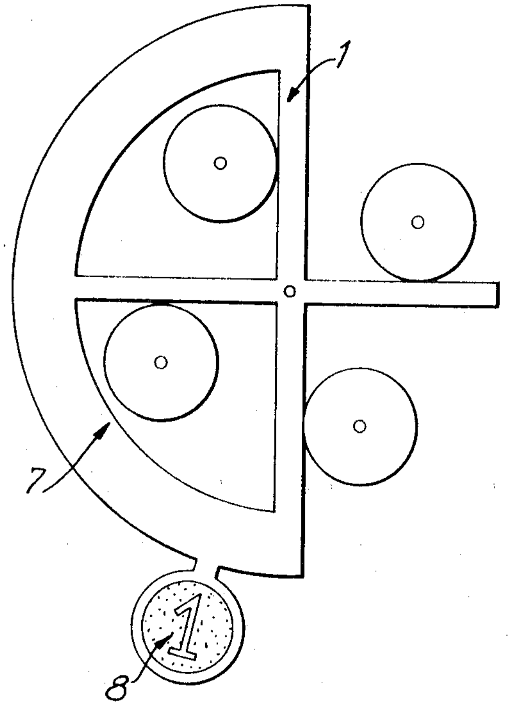
FIG. 5 shows a lever with its auxiliaries required for visualizing purposes.

FIG. 5 illustrates a lever of the type already illustrated in FIG. 1, said lever including furthermore a projection secured thereto and carrying the digit corresponding to said lever, said digit appearing preferably through translucency.

In the case of a code including five or six bits or indicia, each lever includes correspondingly five or six arms.

FIG. 6 illustrates, on a smaller scale, in front and side views, a visualizing arrangement; 1 designates again the individual levers while 9 designates the cam arrangement. The rotation of the cams through one quarter of a revolution is controlled by electromagnets located at 10 through the agency of auxiliary levers such as 11 and 12. The electromagnets are located to either side of a central space 17, as shown in the front view of FIG. 6 and said space is engaged by the projection 8 on the lever which has rocked. An optical system illustrated symbolically by a lens 13 projects into said central space 17 a beam of parallel rays of light emitted by a lamp 14 so as to illuminate the digit carried by the projection 8 after which the beam of light is caused to pass through a further optical system 15 and an enlarged image of the digit thus illuminated is projected on a screen 16 which insures the desired visualization.

It will be noted that each time a lever is caused to rock the lever which previously rocked to exposed position returns to its normal position which leads to an economy in the energy consumed and consequently the control may be performed with a very small expenditure of energy.

A modified embodiment will now be described, which replaces the multi-arm levers with blades as illustrated in FIGS. 7 to 10. The levers are replaced in this case by rectangular blades illustrated in front and side views in FIG. 7. In this embodiment, the cams are replaced by discs carrying a number of arms depending on the basis of the numerical system adopted. By way of example, this embodiment will now be described for the case where the operation at the input is formed of a binary code using four bits, while the output is in the decimal system. In this arrangement, four cams are used which are located in transverse registry with one another and rotate round a common axis, while they remain of course mechanically independent. In this case, also, the cams can occupy only two positions as illustrated in FIG. 8 in side view. When compared with the arms of a conventional cam, including ten arms uniformly distributed about its periphery, the five odd-numbered arms 18 to 22 on the first cam 31 giving out the first digit occupy a position shifted by an angle $\alpha$ while the five other even-numbered arms 22 and 27 are not shifted with reference to the corresponding arms of a conventional cam. As to the second cam 32 corresponding to the second digit of the binary code, the two first arms are angularly shifted while the two next arms are not shifted and so on alternatively. The alternation is thus provided for every two successive arms instead of being executed for each successive arm singly. As to the third cam 33, the alternation is obtained once for every four arms while, in the case of the fourth cam 34, eight successive arms are shifted; that is the first eight arms are shifted while the two last arms are not shifted with reference to the conventionally distributed arms.

It will be noted that the alternations of angularly shifted and non-shifted arms is the same as that of angular setting of the elementary cams in the case of the first embodiment and the last described modification forms consequently, from a mechanical standpoint, only a variation of the precedingly disclosed embodiment. The uniformly distributed blades illustrated in FIG. 7 are located between the arms and are adapted to rock individually on a rotary axis such as that illustrated at 17 (as shown for one blade cooperating with the cam 31), said axes being parallel with the rotary axis of the cams.

In FIG. 8, the positions of the blades are shown with reference to the outline of the first cam 31. Each blade is associated with a spring urging it into a clockwise rotation. Said rotation is allowed or prevented according to the position assumed by the cam arms associated with the blades. For instance, in the position illustrated in FIG. 8, the first cam 31 allows the blades 40, 41, 42, 43 and 44 to rock, while the rocking of the blades 45, 46, 47, 48 and 49 is prevented since the corresponding arms of the cam 31 engage at the moment considered said five last-mentioned blades and prevent their rotation. In this case, the cams can occupy as noted above only two positions, between which the passage is performed through an angular shifting equal to the above-mentioned angle by which the arms have been shifted. It is readily apparent that in the case of the last-mentioned embodiment as in that of the preceding embodiment, only one blade may pivot for a predetermined angular position given in the four cams. Of course, the thickness of each cam is equal substantially to one quarter of the length of a blade.

FIG. 9 shows the projections associated with the blades and carrying the digits, said projections being secured to the blades through extensions such as 50. It is immediately apparent that when a blade is in its normal position, that is when its plane passes through the rotary axis of the cam, the extension rigid with the digit-carrying projection is located outside the central void space extending within the annular series of projections. In contradistinction, when a blade such as 51 (FIG. 9) has pivoted, the corresponding digit, say 5, appears at the center of the arrangement.

An advantageous embodiment of the arrangement which has been described is illustrated diagrammatically in FIG. 10 showing in side view the four cams 62 and the corresponding blades 63. A beam of parallel rays of light produced by the lamp 64 passes centrally of the arrangement through the optical system 65 so as to become convergent after passage through the lens 66 whereby an image of the digit corresponding to a signal is projected onto the screen 67. It will be readily ascertained that the invention described is applicable in particular in all cases where the binary code is used at the input end. It will also be noted that the visualizing system described includes a single lamp which is constantly ignited so that any failure of said lamp is immediately detected.

What I claim is:

1. An apparatus for decoding coded information received in the binary code in the form of N bits permitting the formation of *b* possible combinations, said apparatus comprising a plurality of cams the number of which is equal to N, said cams being adapted to rock, independently of each other, on an axis between two positions representing respective binary values to represent said information, and a plurality of levers the number of which is equal to *b*, said levers being adapted to assume only one operative and only one inoperative position and being held in inoperative position by said cams such that only one lever which corresponds to the information being received is released by all the cams to operative position, means urging each lever when released into said operative position, and digit exhibiting means controlled by each lever.

2. An apparatus as claimed in claim 1, wherein each lever includes a number of arms equal to the number of the cams and held in position thereby, each lever being adapted to pivot round an axis common to all the levers.

3. An apparatus as claimed in claim 1, wherein each cam comprises a disc rotatable on an axis common to all the discs and including a succession of radial projections peripherally distributed thereon and wherein the levers are adapted to rock on axes lying between said projections and peripherally distributed uniformly around the discs, the discs and projections being arranged for releasing only one lever at a time while all other levers are held in inoperative position.

4. An apparatus as claimed in claim 1, wherein the exhibiting means includes a lamp producing a beam of parallel light rays extending in parallel with the cam and lever axes, a digit exhibit carried by each lever and adapted to enter the path of the beam of light when the lever carrying it enters its operative position, and a screen on which the image of the digit is projected by said beam.

References Cited

UNITED STATES PATENTS

| | | | |
|---|---|---|---|
| 1,821,500 | 9/1931 | Dunn | 340—324 X |
| 2,676,289 | 4/1954 | Wulfsberg et al. | 340—324 X |
| 2,708,549 | 5/1955 | Nelson et al. | |
| 2,765,364 | 10/1956 | Hagelin | 35—3 X |

THOMAS B. HABECKER, Primary Examiner

M. SLOBASKY, Assistant Examiner

U.S. Cl. X.R.

340—378